United States Patent
Mehta et al.

(10) Patent No.: US 9,213,938 B2
(45) Date of Patent: Dec. 15, 2015

(54) SYSTEMS AND METHODS FOR ESTIMATING POSE

(75) Inventors: Siddhartha Satish Mehta, Maharashtra (IN); Warren E. Dixon, Gainesville, FL (US); Prabir Barooah, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 481 days.

(21) Appl. No.: 13/701,153

(22) PCT Filed: Jun. 22, 2011

(86) PCT No.: PCT/US2011/041419
§ 371 (c)(1),
(2), (4) Date: Nov. 30, 2012

(87) PCT Pub. No.: WO2011/163341
PCT Pub. Date: Dec. 29, 2011

(65) Prior Publication Data
US 2013/0107039 A1    May 2, 2013

Related U.S. Application Data

(60) Provisional application No. 61/357,210, filed on Jun. 22, 2010.

(51) Int. Cl.
G06N 5/00 (2006.01)
G06K 9/78 (2006.01)
G06K 9/62 (2006.01)
G06T 7/00 (2006.01)

(52) U.S. Cl.
CPC ........... *G06N 5/00* (2013.01); *G06K 9/6215* (2013.01); *G06K 9/78* (2013.01); *G06T 7/0042* (2013.01); *G06T 2207/10016* (2013.01); *G06T 2207/20076* (2013.01)

(58) Field of Classification Search
CPC .......... G06K 9/6215; G06K 9/78; G06N 5/00
See application file for complete search history.

(56) References Cited

U.S. PATENT DOCUMENTS

| | | |
|---|---|---|
| 2004/0168148 A1 | 8/2004 | Goncalves et al. |
| 2005/0182518 A1 | 8/2005 | Karlsson |
| 2007/0288141 A1 | 12/2007 | Bergen et al. |
| 2008/0033645 A1 | 2/2008 | Levinson et al. |
| 2008/0181487 A1 | 7/2008 | Hsu et al. |

OTHER PUBLICATIONS

The International Search Report and Written Opinion dated Feb. 9, 2012.

*Primary Examiner* — Huy T Nguyen
(74) *Attorney, Agent, or Firm* — Wolf, Greenfield & Sacks, P.C.

(57) ABSTRACT

In one embodiment, a method for estimating pose includes generating hypotheses for a pose component under consideration, identifying a mode of a probability mass function associated with the hypotheses, extracting low-noise hypotheses, and averaging the low-noise hypotheses to obtain a pose component estimate.

28 Claims, 10 Drawing Sheets

SYSTEMS AND METHODS FOR ESTIMATING POSE

CROSS-REFERENCE TO RELATED APPLICATIONS

This application is the 35 U.S.C. 5371 national stage of PCT application PCT/US2011/41419, filed Jun. 22, 2011, which claims priority to and the benefit of U.S. Provisional Application No. 61/357,210, filed Jun. 22, 2010, both of which are hereby incorporated by reference in their entirety.

NOTICE OF GOVERNMENT-SPONSORED RESEARCH

This invention was made with Government support under Primary ARMY/ARO #W911NF-09-D-0001 (subcontract KK 9149), awarded by the ARMY/ARO. The Government has rights in the claimed inventions.

BACKGROUND

Guidance and navigation of autonomous vehicles, such as terrestrial rovers and unmanned aerial vehicles (UAVs), are often controlled with the aid of a global positioning system (GPS). In certain situations, however, GPS is unavailable. For example, if a rover is deployed on another planet, GPS cannot be used to control its navigation. Furthermore, if a UAV is flying in a location in which GPS signals may become blocked (e.g., deep within a canyon), GPS cannot be relied upon alone. Therefore, alternative techniques are needed to enable guidance and navigation of autonomous vehicles.

Various techniques have been developed to provide for guidance and navigation control, such as visual servo control, visual odometry, and structure from motion. Common to each of these methods is the problem of estimating the relative pose (rotation and translation) of an object between two images. For a single camera, the rotation and direction of translation are estimated, whereas in case of a stereo camera system, the rotation and the translation vectors are estimated.

Existing methods for pose estimation typically use point correspondence between the two views, which is provided by a feature-tracking algorithm, such as the Kanade-Lucas-Tomasi (KLT) algorithm. Given a minimal set of point correspondence, the relative pose can be estimated by a number of algorithms (the eight point algorithm, the five point algorithm, etc.). However, point correspondences returned by the feature tracker normally contain gross mismatches or large errors in feature point locations, which are commonly referred to as outliers. A central issue in accurate pose estimation is devising robust estimators that can reject such outliers. The most popular solution to this problem has been hypothesize-and-test methods, such as random sample consensus (RANSAC) and its variants. In these methods, hypotheses are generated by randomly choosing a minimal set of corresponding feature point pairs that are required to generate a hypothesis. A hypothesis is typically scored based on how many of the observations are well-explained by the hypothesis, and the hypothesis with the best score is declared the desired estimate. Most of the extensions to the basic RANSAC scheme focus on reducing the computation time, since generating a large number of hypotheses (which is required to obtain a good estimate with high probability) and scoring them is computationally expensive.

RANSAC and other hypothesize-and-test methods choose only one of the many hypotheses that are or can be generated. All other hypotheses are ignored, even those that may be quite close to the true pose. Each hypothesis can be thought of as a noisy "measurement" of the relative pose that is to be estimated. In principle, one should be able to average these measurements in an appropriate sense to compute a more accurate estimate than any of the individual measurements (i.e., hypotheses).

In view of the above, it can be appreciated that an alternative system and method for estimating pose would be desirable.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Introduction and Overview

As described above, there are various drawbacks to current pose estimation methods. Disclosed herein are alternative systems and methods for estimating the pose of an object. More particularly, disclosed is a novel robust pose estimation algorithm. In some embodiments, the algorithm uses two views captured by a calibrated monocular camera, and a collection of pose hypotheses or estimates is generated by utilizing the redundant feature point information from both the images. A probability density function (PDF) of the rotation and translation random variables is evaluated and a robust pose estimate is identified at the mode of the PDF. A subset of estimates with low estimation error is then selected and are then averaged to provide a refined pose estimate.

There are two main hurdles that impede the development of the above-described method. First, many of the pose hypotheses will be corrupted by outliers that have poor accuracy, so including them in the averaging process may lead to little improvement, if any. The second difficulty is that, since a pose is not an element of a vector space, it is not clear how to average multiple noisy measurements of a pose. To address these challenges, rotation and (unit) translation are estimated separately. By expressing the rotation hypotheses as unit quaternions that lie on the unit sphere in four dimensions, and computing a histogram of this data by dividing the sphere into bins, the dominant cluster, or mode, of the rotations can be identified. A subset of the rotations that are within a small geodesic distance of the mode is then extracted. These "low-noise" rotation hypotheses are then averaged to produce the estimate of the rotation. Estimation of unit translations proceeds in substantially the same way, except the data lies on the surface of the unit sphere in three dimensions. When translation (direction as well as magnitude) is available, for example from a stereo camera, mode estimation and averaging is simpler since the data lies in a vector space. Because of the role played by gridding of the unit sphere in three or four dimensions, the proposed algorithm may be referred to as the pose estimation by gridding of unit spheres (PEGUS) algorithm.

In contrast to hypothesize-and-test methods such as RANSAC, the disclosed algorithm averages the information from a number of hypotheses that are likely to be close to the true pose. As a result, the algorithm generates a more accurate estimate than that returned by RANSAC-type methods. Another advantage of the PEGUS algorithm is that it does not require an iterative search, so the time required for its execution is not only small but highly predictable. This aspect of the algorithm makes it suitable for real-time applications.

Figure 1A:
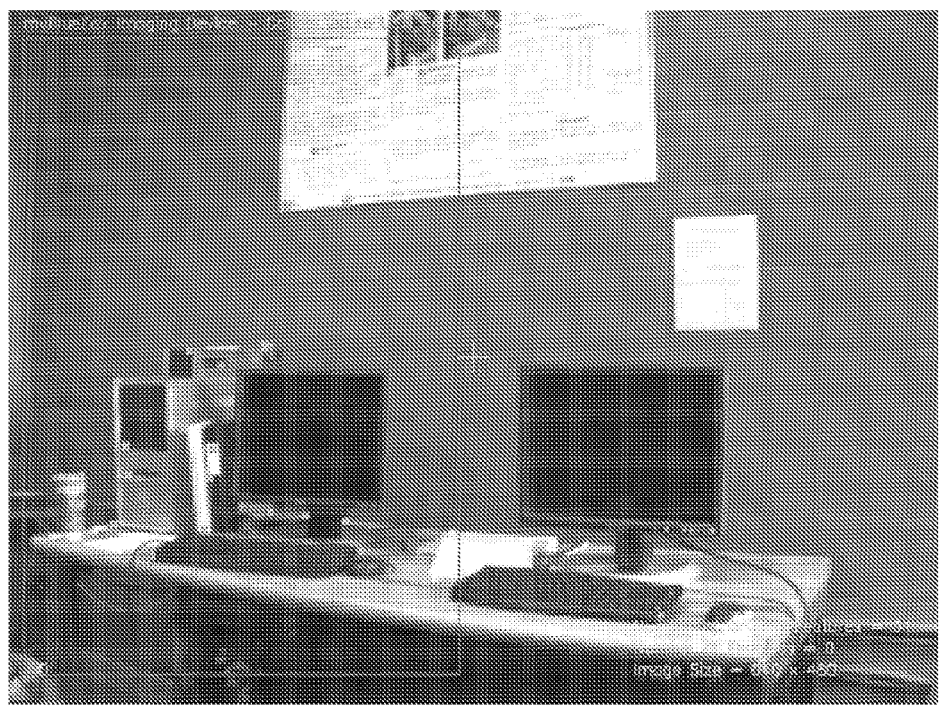
FIGS. 1A and 1B are two alternative images (views) of a scene, each image identifying matched feature points between the images.
Figure 1B:
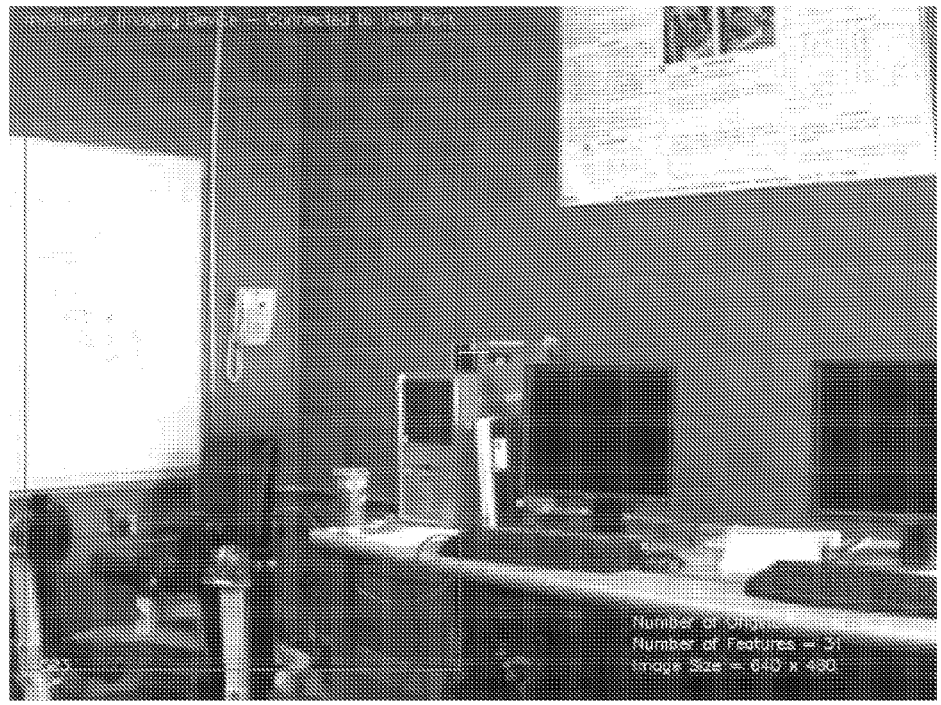
Figure 2:
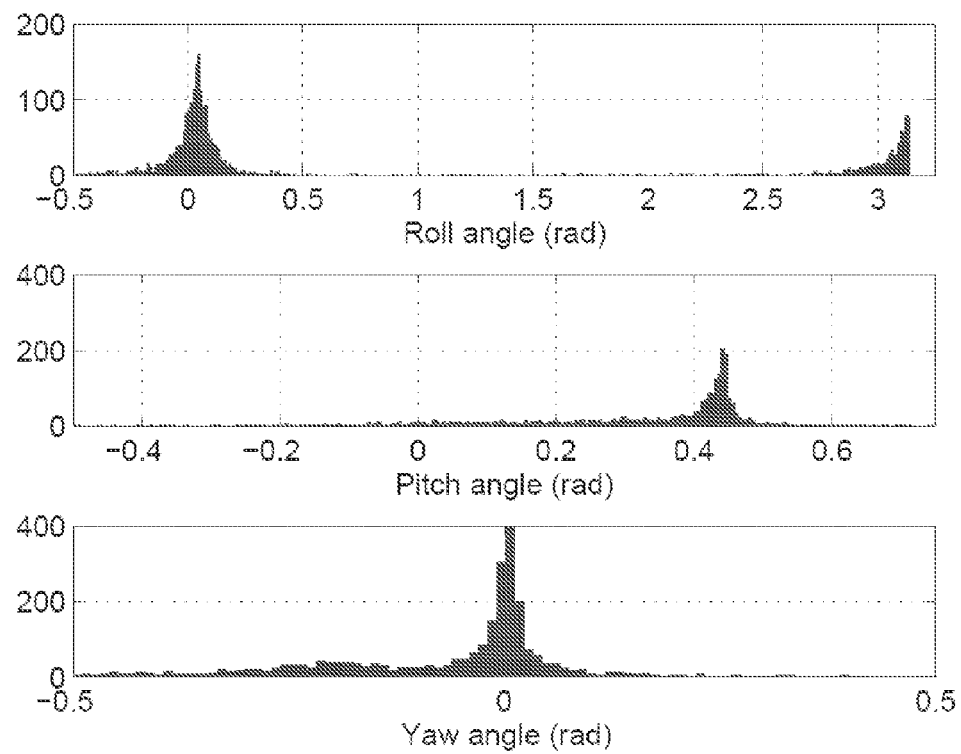
FIG. 2 is a histogram of Euler angle data obtained from 5,000 hypotheses of the rotation between the two images shown in FIGS. A and 1B.
Figure 3:
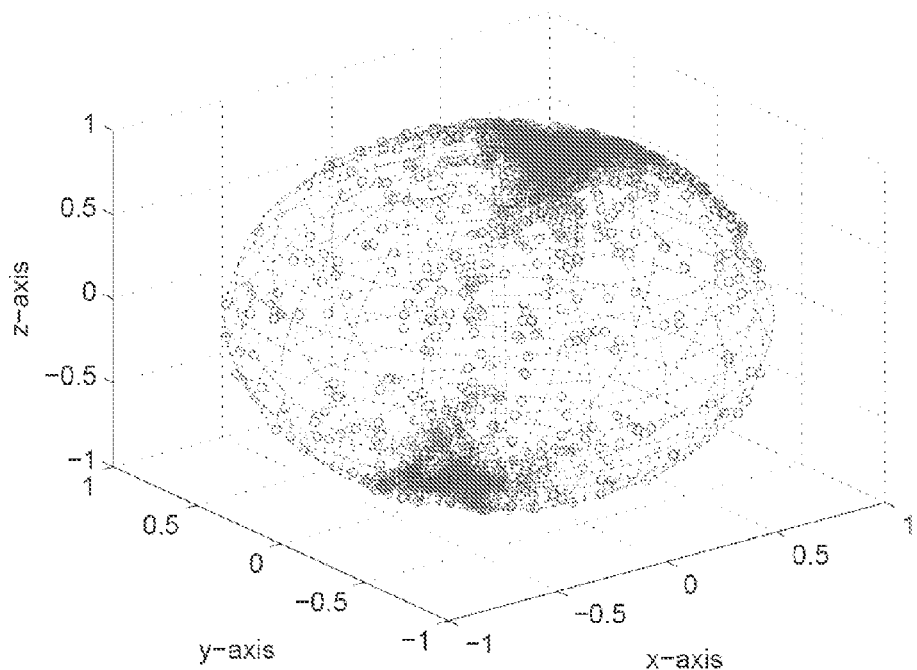
FIG. 3 is a graphical depiction of 5,000 hypotheses of the unit-translations between the two images shown in FIGS. 1A and 1B on a 2-sphere.

There are certain similarities between the disclosed method and the nonlinear mean shift algorithm method in which a set of generated hypotheses are used to construct a kernel-based estimate of the PDF of the pose hypothesis. Specifically, both methods construct estimates of the probability density (or mass) function from a set of generated hypotheses and return an averaged hypothesis as the pose estimate rather than a single hypotheses from those generated. However, there are significant differences between the PEGUS algorithm and the nonlinear mean shift algorithm. First, the PEGUS algorithm is far more robust to multi-modal densities of the generated hypotheses than mean shift. Experimental evidence suggests that the distribution of these hypotheses are typically multi-modal. As an example, all the possible hypotheses from 31 matched feature points between the image pair shown in FIGS. 1A and 1B were calculated using the normalized 8-point algorithm. FIG. 2 shows a histogram of the Euler angles obtained from the rotation hypotheses and FIG. 3 shows the unit translation hypotheses (direction of translation), which are points on the surface of the unit sphere in three-dimensions. Multi-modality of the distribution is clear from the figures. In such a situation, the iterative search involved in the mean shift algorithm will converge to a local maximum depending on the initial condition. In contrast, since the disclosed method constructs a histogram-based estimate of the probability mass function (PMF) of the hypotheses, locating the global mode is trivial even with multi-modal densities. The PMF for the rotation hypothesis is constructed by gridding the surface of the unit sphere in four dimensions, on which unit quaternion representations of the rotations lie. The same method works for unit translations as well, by gridding the surface of the unit sphere in three dimensions. If both magnitude and direction of translation can be estimated, the histogram is constructed by dividing a region of IV into a number of cells.

A second major difference is that the nonlinear mean shift algorithm returns the mode as the estimate, whereas the disclosed algorithm uses the mode only to identify a set of hypotheses that are likely to be close to the true pose. These "low-noise" hypotheses are then explicitly averaged in an appropriate manner to construct the final estimate. In addition, the proposed method does not involve iterative computation, whereas the mean shift algorithm requires an iterative search for the mode.

In the following disclosure, the approach behind the PEGUS algorithm, the algorithm itself, and experimental results are described, as well as example pose estimation systems and methods.

Problem and Approach

An objective is to develop a robust pose estimation algorithm using two images (views) captured by a monocular camera (or four images if a pair of cameras is used) without the knowledge of the scene. Let R denote the true rotation between two views and t be the true translation. The translation can be a unit translation if scale information is not available.

If there are M pairs of feature points between two views captured by the camera and the minimal number of feature point pairs needed to generate a hypothesis is P, then the total number of pose hypotheses that can be computed is $$N_{max} = \binom{M}{P}.$$

In the disclosed method, n such hypotheses are generated, where n is typically much smaller than $N_{max}$. Each pair of generated rotation and translation hypothesis can be thought of as a "noisy measurement" of the true rotation R and true (unit) translation t, respectively. Some of these measurements suffer from large inaccuracy, as is apparent from FIGS. 2 and 3. Therefore, the desired approach is to select a subset of "low-noise" hypotheses from the set of all possible hypotheses that are close to the true rotation and translation. The low-noise hypotheses are then appropriately averaged to compute a pose estimate.

To facilitate extraction of the low-noise hypotheses, each rotation hypothesis is expressed in terms of its unit quaternion representation. Since the unit quaternions q and −q represent the same rotation, it is ensured that the unit quaternion representation of a rotation hypothesis has the first component positive. That is, if $q=q_r+iq_1+jq_2+kq_3$, then $q_r>0$. A unit quaternion representation of a rotation matrix can then be thought of as a unit-norm vector in $\mathbb{R}^4$ whose first component is positive. That is, it lies on the "top" half of the 3-sphere $\mathbb{S}^3$. The d-sphere $\mathbb{S}^d$ is defined as $$\mathbb{S}^d := \{x = [x_1, \ldots, x_{d+1}]^T \in \mathbb{R}^{d+1} \| \|x\| = 1\} \quad (1)$$

where $\|\cdot\|$ denotes the Euclidean norm. Similarly $$\mathbb{S}^{d+} = \{x \in \mathbb{R}^{d+1} \| \|x\| = 1, x_1 \geq 0\} \quad (2)$$

Therefore, each rotation hypothesis is an element of $\mathbb{S}^{3+}$. Similarly, each hypothesis of unit translation is an element of $\mathbb{S}^2$. If scale information is available, translation hypotheses are elements of $\mathbb{R}^3$ instead of $\mathbb{S}^2$.

Since each rotation hypothesis is a noisy measurement of the true rotation, the rotation hypotheses can be thought of as realizations of a random variable whose distribution is defined over the half-sphere $\mathbb{S}^{3+}$. By dividing the surface of the sphere $\mathbb{S}^3$ and counting the number of rotation hypotheses (their unit quaternion representations), the PMF of this random variable can be estimated. The mode of the PMF is a point in the region or bin that has the largest number of unit quaternions. A subset of these quaternions that are within a predetermined geodesic distance of the mode is selected, and then averaged in an appropriate manner to obtain the final estimate of the rotation. Estimation of translations proceed in a similar manner. An example algorithm is described in detail in the next section.

Rotation and Translation Estimation

Hypotheses generation will now be described. As indicated above, the total number of possible pose hypotheses, $N_{max}$, is typically extremely large since $$N_{max} = \binom{M}{P},$$

where M is the number of point correspondence and P is the minimal number needed to generate a hypothesis. For example, even a small value of M, e.g., M=21, with P=8 yields $N_{max}$=203,490. Processing such a large number of hypotheses is computationally unattractive. Fortunately, processing all of them is not necessary since most of these hypotheses will be "correlated" because they are generated from overlapping feature point sets. A sampling with replacement strategy is used to generate a number of hypotheses that have small correlations among one another. The number of such hypotheses to be generated, n, is a design parameter that is specified a priori. However, even with a small value of n (≈100) the method yields beneficial results. The sampling strategy comprises selecting the first feature point pair at random from the M pairs, then selecting the second pair from the remaining M−1 pairs, and so on until the P-th pair is selected. These P pairs of point correspondence are used to generate a hypothesis. This sampling procedure is repeated n times to generate n hypotheses, which are denoted by $q_i$, $t_i$, where $q_i$ is an unit quaternion and $t_i$ is a translation vector (unit-norm or otherwise) for i=1, . . . , n. The set of these n rotation hypotheses is denoted by $S_q$, and the set of translation hypotheses is denoted by $S_t$.

Figure 4:
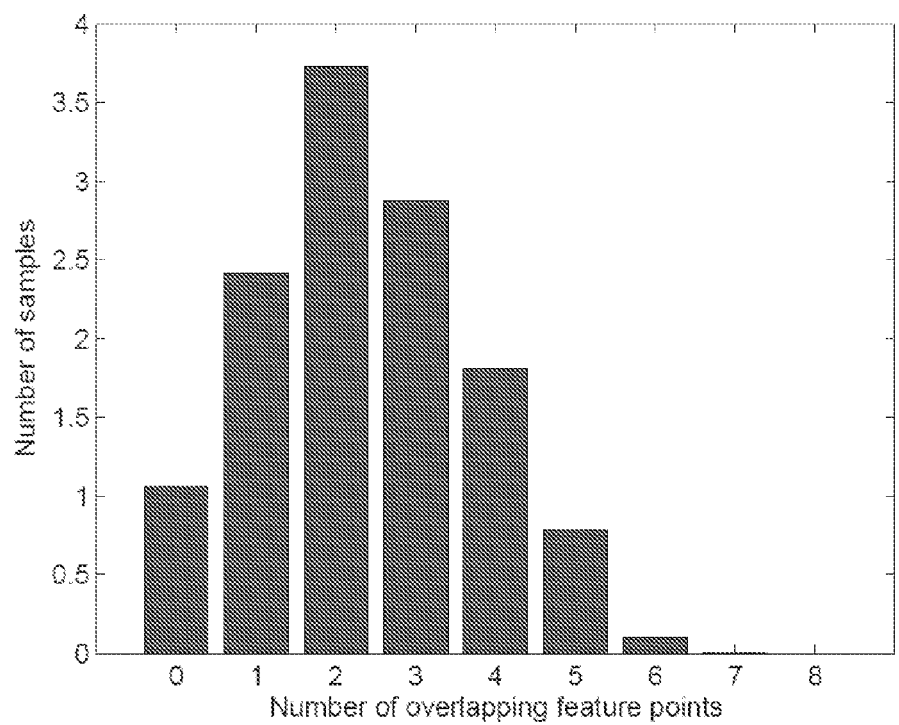
FIG. 4 is a histogram of the feature point overlap between 100 hypotheses generated by a uniform sampling strategy computed based on the average of 1,000 random trials of hypotheses generation.

FIG. 4 illustrates the small correlation among the hypotheses generated by the sampling strategy mentioned above. A set of hypotheses $q_1$, . . . , $q_j$ has an overlap of l if there are exactly l feature point pairs that are common to the sets of points used to generate the hypotheses $q_1$, . . . , $q_j$. The metric for measuring correlations among hypotheses is the number of overlap among them. The figure shows a histogram of the overlap between 100 hypotheses generated in this fashion, computed based on the average of 1,000 random trials of the hypotheses generation.

Estimating the mode in the context of rotation will now be described. Each $q_i$ is considered to be the realization of a random variable q with an unknown distribution defined over $\mathbb{S}^{3+}$. The 3-sphere $\mathbb{S}^3$ is divided into a number of regions of equal area, or bins, that are denoted by $B_j$, j=1, . . . , $K_q$, where $K_q$ is the (appropriately chosen) number of bins. The PMF of the random variable q over the bins $B_j$, which is denoted by $p^{(q)}$, is an array of $K_q$ numbers: $p_j^{(q)}$=P(q∈$B_j$), where P denotes probability. A histogram estimate $\hat{p}^{(q)}$ of the PMF $p^{(q)}$ is computed by counting the number of points $q_i$ inside each bin:

$$\hat{p}_j^{(q)} = \frac{1}{n} \sum_{i=1}^{n} I_{B_j}(q_i),$$

where $I_A(x)$ is the indicator function of the set A. That is, $I_A(x)$=1 if x∈A and 0 otherwise. A useful property of the histogram-based estimate is that $\hat{p}_j^{(q)}$ is an unbiased estimate of $p_j^{(q)}$ even if the samples used to construct the estimates are correlated. Let $B_{j^*}$ be the bin in which the PMF attains its maximum value, i.e., $j^*$=argmax$_j$($\hat{p}_j^{(q)}$). If the number of $K_q$ is large so that each bin is relatively small, then the center of $B_{j^*}$ is taken as the estimate of the mode of the PMF $p^{(q)}$, which is denoted by $q^* \in \mathbb{S}^{3+}$. If a small $K_q$ is chosen so that each bin is relatively large, the geodesic distances between the center of $B_{j^*}$ and the $q_i$'s lying in $B_{j^*}$ are computed and then averaged to identify the dominant cluster of points inside this bin. If there is such a set of points that form a dominant cluster, their center is chosen as the mode. The center is computed by taking the arithmetic mean of the unit quaternions (thinking of them as four-dimensional vectors) within the cluster and then normalizing the mean.

Extracting low-noise measurements will now be described. Once the mode is identified, a subset $Q_q \subset S_q$ is selected that consists of those $\hat{q}_i \in S$ that satisfies $$d_q(q^*, q_i) < \epsilon_q \tag{3}$$

where the distance function $d_q(q^*, q_i) < \epsilon_q$ is the Riemannian distance. The Riemannian distance between two rotations $q_1, q_2 \in \mathbb{S}^{3+}$ is given by $$d(R_1, R_2) = \frac{1}{\sqrt{2}} = \|\log(R_1^T R_2)\|_F \tag{4}$$

where $R_1, R_2 \in SO(3)$ are the rotation matrix representation of $q_1, q_2$, and the subscript F refers to the Frobenius norm.

Averaging low-noise data will now be described. Let $N_1$ be the number of elements in the low-noise data set $Q_q$ of rotations obtained as described above, and let $R_i$ denote the rotation matrix corresponding to $q_i \in Q_q$. The optimal average of the rotation matrices $R_1 \ldots R_{N_1}$ in the Euclidean sense is the matrix $\hat{R}$ that satisfies $$\hat{R} = \underset{R \in SO(3)}{\mathrm{argmin}} \sum_{i=1}^{N_1} \|R_i - R\|_F^2. \tag{5}$$

It has been shown that $\hat{R}$ defined by Equation (5) can be computed by the orthogonal projection of the arithmetic average $$\overline{R} = \sum_{i=1}^{N_1} \frac{R_i}{N_1}$$

onto the special orthogonal group SO(3) by $$\hat{R} = \overline{R} U \mathrm{diag}\left(\frac{1}{\sqrt{\Lambda_1}}, \frac{1}{\sqrt{\Lambda_2}}, \frac{s}{\sqrt{\Lambda_3}}\right) U^T \tag{6}$$

where the orthogonal matrix U is such that $$\overline{R}^T \overline{R} = U^T D U \text{ and } D = \mathrm{diag}(\Lambda_1, \Lambda_2, \Lambda_3), \tag{7}$$

and s=1 if det$\overline{R}$>0 and s=−1 otherwise. The matrix $\hat{R}$ computed using Equation (6) is the desired estimate of the true rotation R.

The estimation scheme for unit translation is very similar to that for the rotation. The unit translation data $t_i \in S_t$, i=1, . . . , n represent realizations of the random variable t with an unknown distribution defined over the 2-sphere $\mathbb{S}^2$. The 2-sphere $\mathbb{S}^2$ is divided into a number of bins of equal area $B_j$, $j_1, \ldots, K_t$, where $K_t$ is the (appropriately chosen) integer. A histogram estimate $\hat{p}^{(t)}$ of the PMF $p^{(t)}$, where $p_j^{(t)} := P(t \in B_j)$ is then computed by counting the number of points $t_i$ in $B_j$. When $K_t$ is large, the mode of the unit translation distribution, denoted by $t^*$, is taken as the center of the bin $B_{j^*}$ in which the PMF takes its maximum value: $j^* = \arg \max_j \hat{p}_j^t$. When the number of bins $K_t$ is small, a method similar to the one used for rotations is used to estimate the mode. Once the mode $t^*$ is identified, the low-noise data set $Q_t$ is selected by choosing those $t_i \in S_t$ that satisfies $$d_t(t^*, t_i) < \epsilon_t \qquad (8)$$

where $\epsilon_t$ is a pre-specified small positive number, and $d_t(t_1, t_2)$ is the geodesic distance between the unit translation vectors $t_1$ and $t_2$. Let $N_2$ be the number of elements in the low-noise data set $Q_t$ of the unit translations obtained above. The normalized arithmetic mean of the unit translations in the set $Q_t$, which is given by $$\hat{t} = \frac{\sum_{i=1}^{N_2} \frac{t_i}{N_2}}{\left\| \sum_{i=1}^{N_2} \frac{t_i}{N_2} \right\|} \qquad (9)$$

is taken as the estimate of the unit translation t.

When scale information is available, for example, when a stereo camera pair is used, $t_i$'s are hypotheses of the translation between the two views and are elements of $\mathbb{R}^3$, not of $\mathbb{S}^2$. In this case, histogram construction, mode estimation, and low-noise hypotheses extraction is carried out in $\mathbb{R}^3$ by dividing a particular volume of $\mathbb{R}^3$ into $K_t$ bins of equal volume, with each bin being a cube with equal sides. The volume to grid is chosen so that all the hypotheses lie within it. The rest of the algorithm stays the same, except that the Euclidean norm of the difference is used as the distance function $d_t(\bullet, \bullet)$ in Equation (8), and the normalization step in Equation (9) is omitted.

Performance Evaluation

To test the performance of the proposed algorithm, 970 images of a stationary scene were captured by a moving monocular camera (make: Matrix Vision GmbH; model: mvBlueFox-120aC; resolution: 640×480) mounted on a 2-link planar manipulator. The 2-link manipulator was equipped with rotary encoders on each motor with 614,400 readings/revolution, which provided the ground truth of rotation and translation between any two time instants. FIGS. 1A and 1B show the initial and the final images of the scenes captured by the camera.

Figure 5:
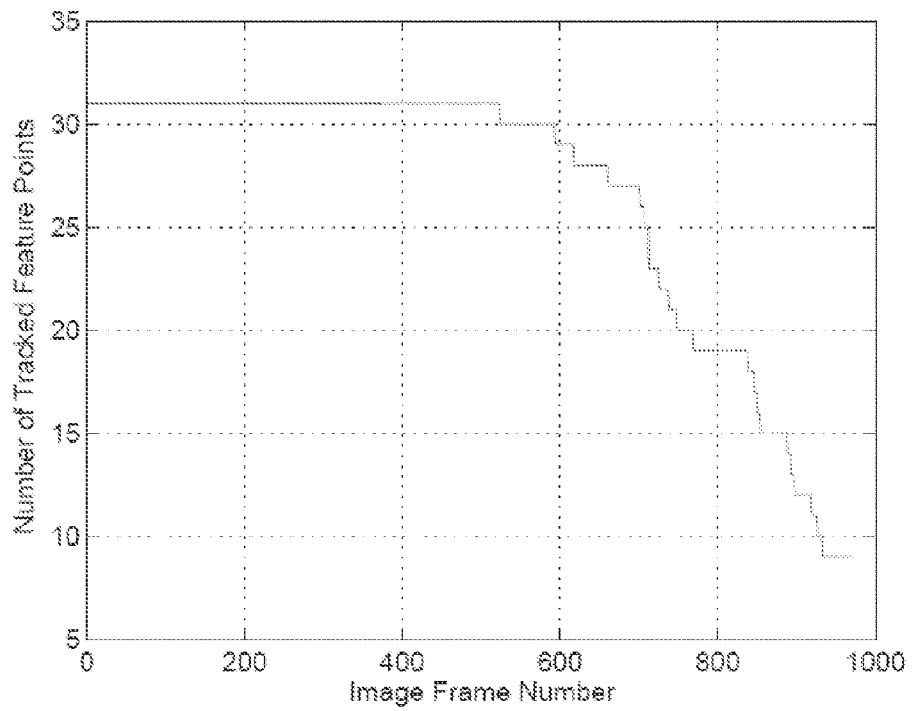
FIG. 5 is a graph of the number of feature points tracked during a sequence of 970 images taken by a camera in which the number of pairs of matched feature points between the first and the second image pair is 31 and that between the first and the 970th image is 9.

A multi-scale version of a Kanade-Lucas-Tomasi (KLT) feature point tracker was implemented to track the features in successive images as the camera underwent rotation and translation. Thirty-one (31) feature points were detected in the first image of the sequence. Due to the camera motion, restricted field-of-view (FOV), feature point tracking errors, etc., the number of tracked feature points reduced with time (see FIG. 5).

The performance of the PEGUS algorithm was evaluated by comparing the relative pose estimates to the ground truth. The performance of the algorithm was also compared with that of RANSAC+least squares (outlier rejection by RANSAC followed by re-estimation of the pose by feeding all the inlier data into the normalized 8-point algorithm) and the nonlinear mean shift algorithm described above. For all the three methods, a normalized 8-point algorithm was used to generate relative pose hypothesis (rotation and unit translation) between the two frames from a minimal number of 8 pairs of matched feature points. The same set of hypotheses were used as inputs to the PEGUS algorithm and the nonlinear mean shift.

The parameters used for the proposed method were $K_q = 11$, $\epsilon_q = 0.0223$, $K_t = 7$, $\epsilon_t = 0.017$. The parameter n was nominally set to 100, except when the number of matched feature points M between two views is so small that $N_{max} < n$, in which case $n = N_{max}$ was used. For the nonlinear mean shift algorithm, a bandwidth of 0.7 and a Gaussian kernel with mean 0 and variance 1 was used, with a stopping criteria that the norm of the gradient of mean-shift vector is less than $7 \times 10^{-4}$. For RANSAC, a Sampson distance of 0.005 was used as a threshold between the data points and the model.

Figure 6A:
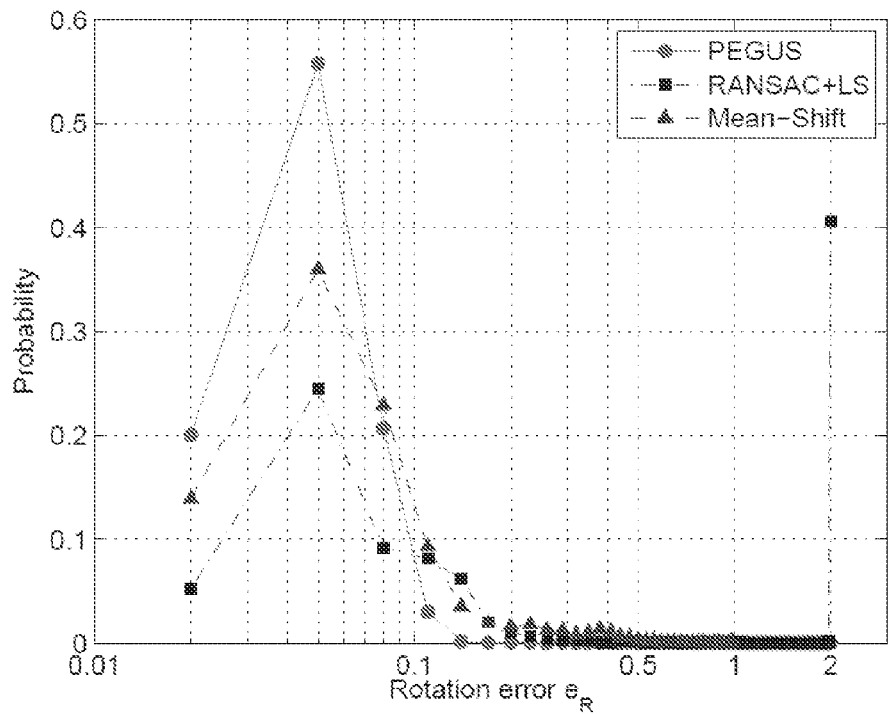
FIGS. 6A and 6B are graphs that compare the estimation accuracy achieved by the disclosed PEGUS algorithm with RANSAC+LS and a nonlinear mean shift algorithm.
Figure 6B:
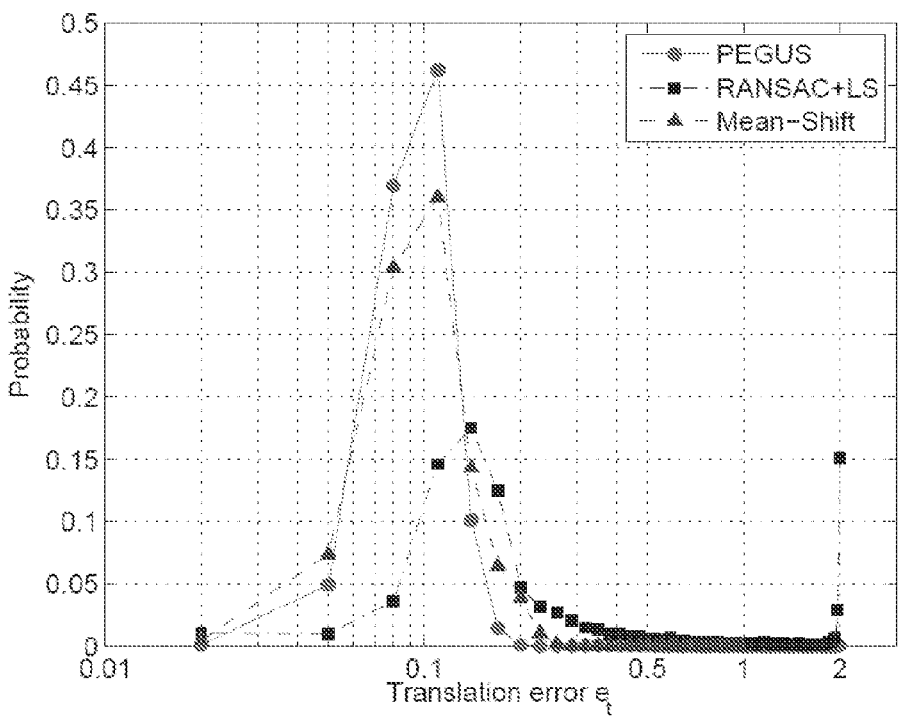

The performance of each of the three pose estimation algorithms (PEGUS, RANSAC+least squares, nonlinear mean shift) was evaluated in the following manner. A total of 9,000 image pairs are selected arbitrarily from the 970 images captured. The true rotation and translation between the frames in the i-th image pair were denoted as R(i) and t(i), respectively, which were obtained from encoder measurements. The rotation and translation estimation error for the i-th image pair are defined as $$e_R(i) = \| I - R(i)^T \hat{R}(i) \|$$

$$e_t(i) = \| t(i) - \hat{t}(i) \| \qquad (10)$$

where $\hat{R}(i)$ and $\hat{t}(i)$ are the estimates of the rotation R(i) and unit translation $\|\bullet\|$ denotes the 2-norm, and I denotes a $\mathbb{R}^{3 \times 3}$ identity matrix. For each of the three algorithms, the 9,000 samples of the errors were computed (Equation 10) and were used to estimate the PMF of the rotation and translation errors that resulted from the particular algorithm. The error probabilities for the three methods: PEGUS, RANSAC+least squares, and nonlinear mean shift, are shown in FIGS. 6A and B. The mean and standard deviation of the rotation and translation errors are tabulated in Table 1. The figures and the table show that the estimation error with the proposed method was significantly lower than that with RANSAC and nonlinear mean shift.

TABLE 1

| Algorithm | Rot. Error | | Trans. Error | |
| --- | --- | --- | --- | --- |
| | Mean | Std. Dev. | Mean | Std. Dev. |
| PEGUS | 0.0533 | 0.0390 | 0.1010 | 0.0438 |
| RANSAC + LS | 0.8726 | 0.9383 | 0.6177 | 0.7340 |
| MEAN SHIFT | 0.1016 | 0.1163 | 0.1092 | 0.0371 |

Figure 7:
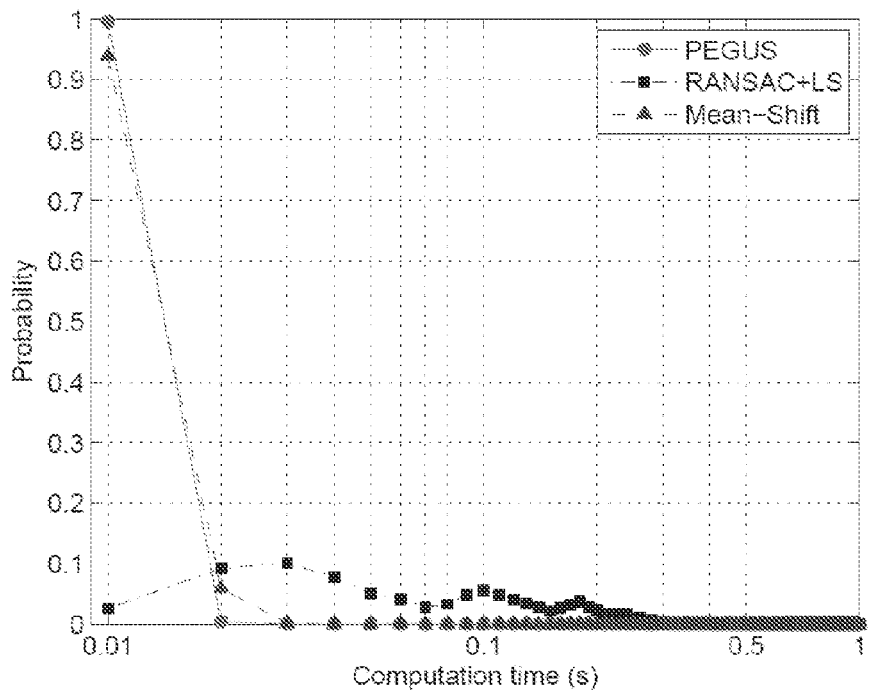
FIG. 7 is a graph that compares the computation time required by PEGUS, RANSAC+LS, and the nonlinear mean shift algorithm.

A computational time comparison for the three methods is shown in FIG. 7, which indicates that the disclosed algorithm is faster than both RANSAC and mean shift algorithms. All computations were done using MATLAB in a desktop Linux machine. In addition, the computational time of PEGUS is more predictable compared to that of RANSAC and mean shift. The reason for this is that, in contrast to both RANSAC and mean shift, PEGUS does not involve iterative search. It is noted that these trends may change depending on the parameters of the algorithms. For example, execution time of the mean shift algorithm may be reduced by increasing the bandwidth, which may affect its accuracy.

The accuracy of the estimate obtained by the PEGUS algorithm depends on the pose hypotheses that are generated in the beginning. Note that since each distinct P pairs of point correspondence leads to a distinct hypothesis of q and t. Let h be the random variable representing the hypothesis that is obtained when the SRSWR sampling scheme is executed one. The possible values that h can take are denoted by $h_i$, $i=1$, $N_{max}$. Each $h_i$ is a pair $q_i$, $t_i$. Since there is a mapping from each set of P feature point pairs to hypotheses, (e.g., the 8-point algorithm).

Proposition 1: The SRSWR scheme for hypotheses generation ensures that each possible hypothesis is obtained with equal probability, i.e., $$P(h = h_i) = \frac{i}{N_{max}}.$$

Proof: A hypothesis h is uniquely defined by the P point correspondence used to generate it, which are denoted by $f^1$, $f^2$, ..., $f^P$. It is assumed that the all feature point pairs are sorted to have increasing index from 1 through M.

$$P(h = h_i) = P(f^1 = h_i^1, f^2 = h_i^2, \ldots, f^P = h_i^P) \quad (11)$$

$$= \prod_{k=2}^{8} P(f^k = h_i^k \mid f^{k-1} = h_i^{k-1}, \ldots, f^1 = h_i^1) \times P(f^1 = h_i^1)$$

where the second equality follows from the chain rule of conditional probability.

Example Systems and Methods

Figure 8:
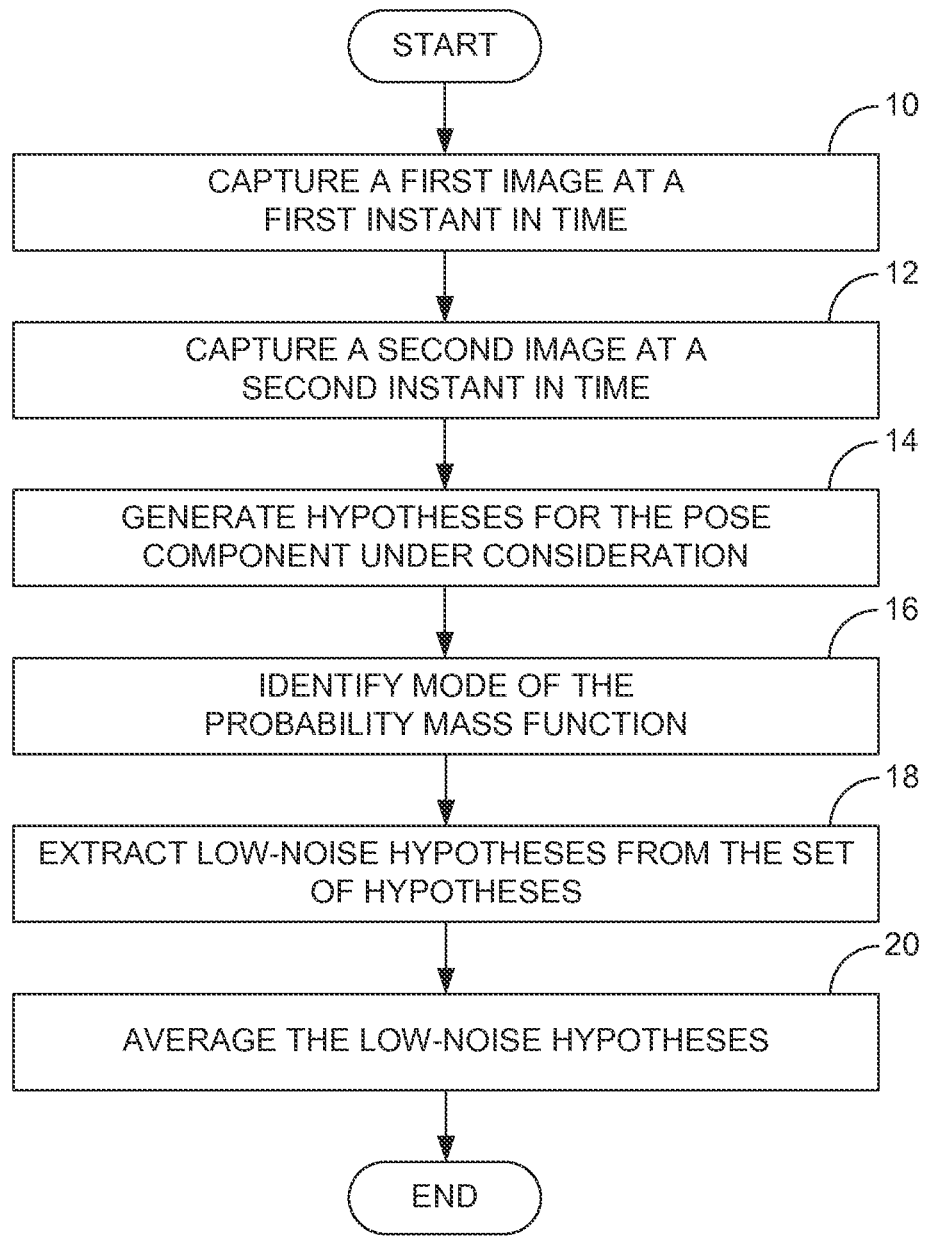
FIG. 8 is a flow diagram of an embodiment of a method for estimating the pose of an object.

FIG. 8 illustrates an overview of an example method for estimating pose consistent with the discussion presented above. By way of example, the method described below is performed at predetermined increments of time as an autonomous vehicle is operated. For purposes of discussion, it is assumed that the method is performed using a single camera.

Beginning with block 10, a first image is captured by a camera at a first instant in time. After a predetermined amount of time (e.g., several milliseconds) has passed, a second image is captured by the camera at a second instant in time, as indicated in block 12. If the vehicle, and therefore the camera, moved between the first and second instances of time, the two images will be different.

Once the two images have been captured, hypotheses are generated for the pose component under consideration (i.e., rotation or translation), as indicated in block 14. Notably, each component is estimated separately. As described above, each hypothesis can be mathematically considered to be a point on the surface of a sphere (i.e., a four-dimensional unit sphere for rotation and a three-dimensional unit sphere for translation). With reference to block 16, the mode of the probability density function (PDF) of the hypotheses is next identified. The mode of the PDF is the point at which the function attains its maximum value, which correlates to the likely true value for the rotation or translation. The hypotheses that are closest to the true value (i.e., the hypotheses) with the least amount of noise are those that are clustered around the mode on the surface of the sphere.

After the mode has been identified, a number of low-noise hypotheses are extracted, as indicated in block 18. In some embodiments, the low-noise hypotheses are those that are within a predetermined distance of the mode.

Once the low-noise hypotheses have been extracted, they are averaged to produce an estimate of the motion component, as indicated in block 20.

Figure 9A:
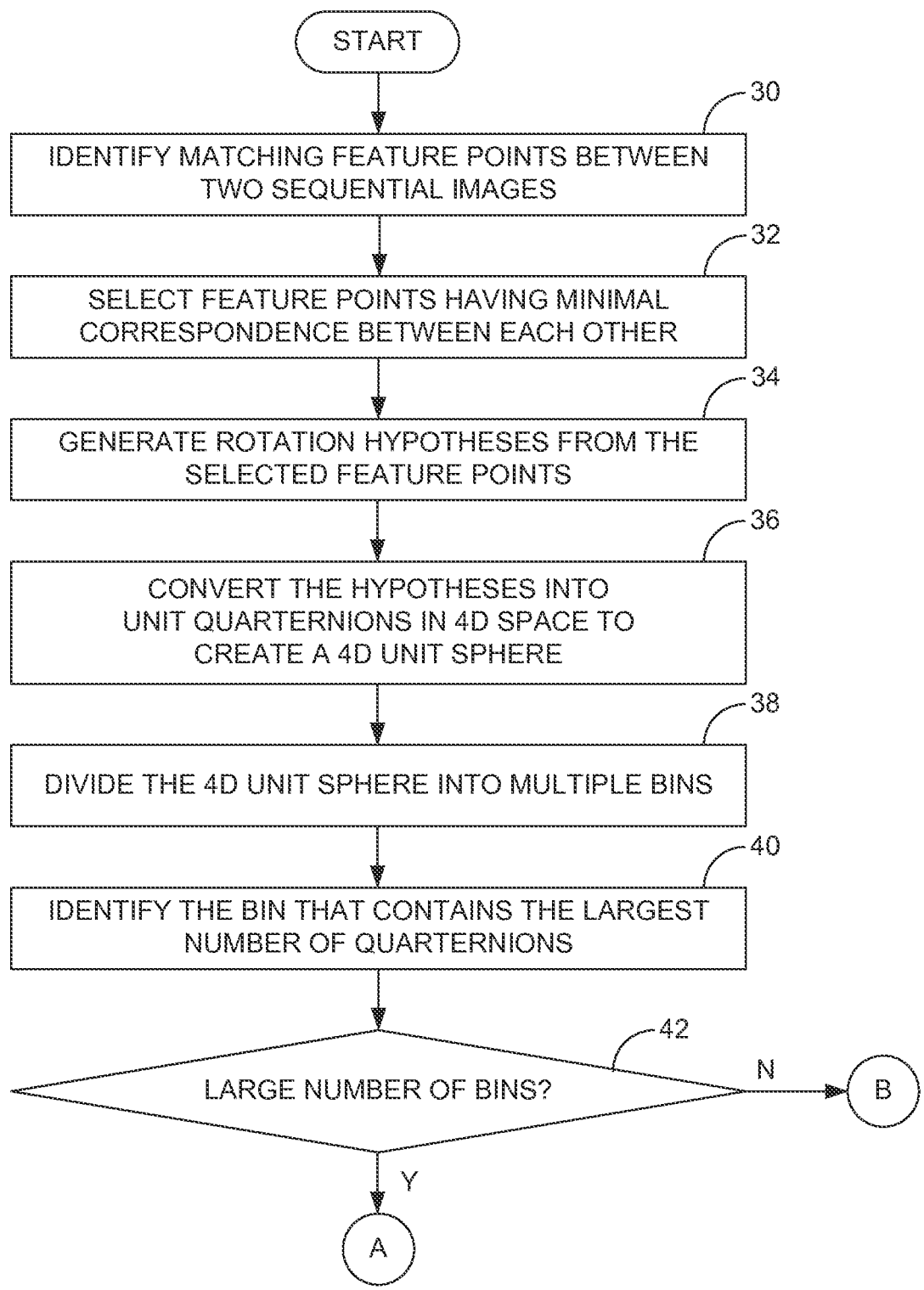
FIGS. 9A and 9B provide a flow diagram of an embodiment of a method for estimating a rotation component of pose.
Figure 9B:
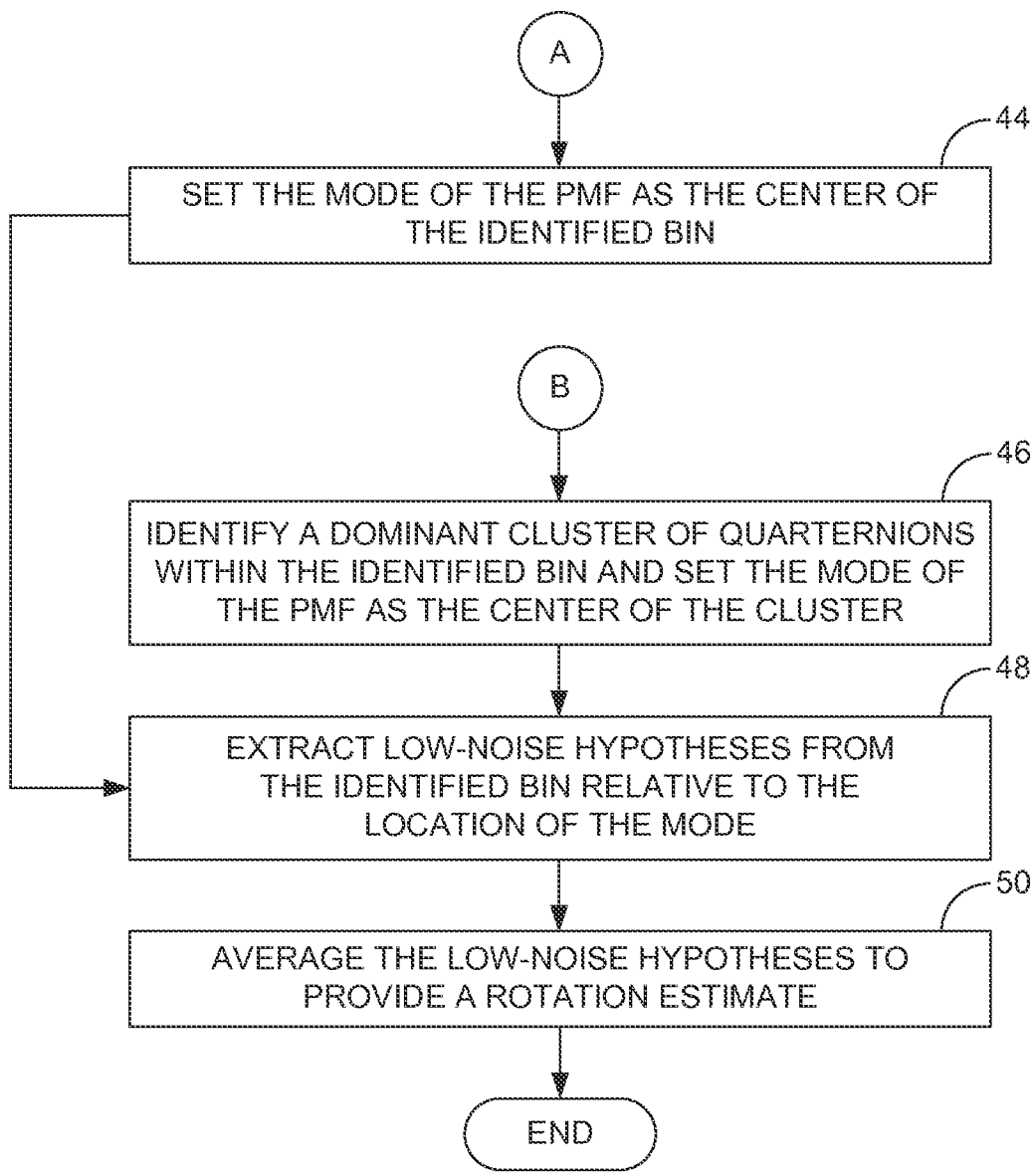

FIGS. 9A and 9B illustrate an example method for estimating the rotation component of pose. In this example, it is assumed that a single camera was used to capture sequential images of a scene. Beginning with block 30 of FIG. 9A, multiple matching feature points is identified between two sequential images. Although it is possible to identify many pairs of matching feature points, only a subset of those feature points is needed to estimate the rotation between the two images. By way of example, only eight pairs of matching feature points are required to estimate the rotation. Therefore, the number of feature points, and rotation hypotheses that will be generated, can be reduced by selecting a subset of the feature points.

The accuracy of the rotation estimation can be increased by ensuring that the selected subset of matching feature points comprises features points that do not overlap. Therefore, as indicated in block 32, the feature points that have minimal correlation between each other are selected. By way of example, the feature point overlap can be chosen to be no greater than four, meaning that, between any of the generated combinations of matching pairs of feature points, there will not be more than four points in common. In some embodiments, the number of feature points will still be large after the above process is performed. In such cases, it may be desirable to select a further subset of the combinations, for example using a random sampling with replacement procedure.

Referring next to block 34, rotation hypotheses are generated from the selected feature points. In some embodiments, the hypotheses are generated using a normalized 8-point algorithm, which outputs rotation hypotheses as rotation matrices, such as 3×3 matrices, that characterize the rotation between the two images. Once the hypotheses have been generated, they are converted into unit quaternions in four-dimensional space to create a four-dimensional unit sphere, as indicated in block 36. The quaternions each comprise a four-dimensional vector with a magnitude of one. Therefore each quaternion identifies a point that lies on the surface of the four-dimensional unit sphere.

At this point, the mode of the PDF of the hypotheses can be identified. The mode of the PDF is the point at which the function attains its maximum value, which correlates to the point on the surface of the four-dimensional unit sphere around which the largest number of quaternions are clustered. The hypotheses closest to the mode have the least amount of noise. In this embodiment, the mode is identified by first dividing the four-dimensional unit sphere into equal regions or bins, as indicated in block 38. By way of analogy, the bins can be thought of as areas of a grid formed on the surface of a 3D sphere. Next, the bin that contains the largest number of quaternions is identified, as indicated in block 40. The identified bin is the bin that is most likely to contain the true value of the rotation.

Once the bin that contains the largest number of quaternions has been identified, flow from this point can depend upon the number of bins that were created. With reference to decision block 42, if a large number of bins was created (meaning that each bin is relatively small), flow continues to block 44 of FIG. 9B and the mode can be set as the center of the identified bin. If, on the other hand, a relatively small number of bins was created (meaning that each bin is relatively large), flow continues to block 46 of FIG. 9B and the mode is set as the center of the dominant cluster of quaternions within the identified bin.

Irrespective of the manner in which the mode is determined, low-noise hypotheses are next extracted from the identified bin relative to the location of the mode, as indicated in block 48. In some embodiments, the low-noise hypotheses are extracted by determining the geodesic distance of each quaternion within the identified bin from the mode and selecting the quaternions that are within a predetermined distance of the mode. The distance is a design parameter that can be selected by the user.

Once the low-noise hypotheses have been extracted, they are averaged to produce an estimate of rotation, as indicated in block 50. A single quaternion results that can then be converted back into a rotation matrix, if desired.

Figure 10A:
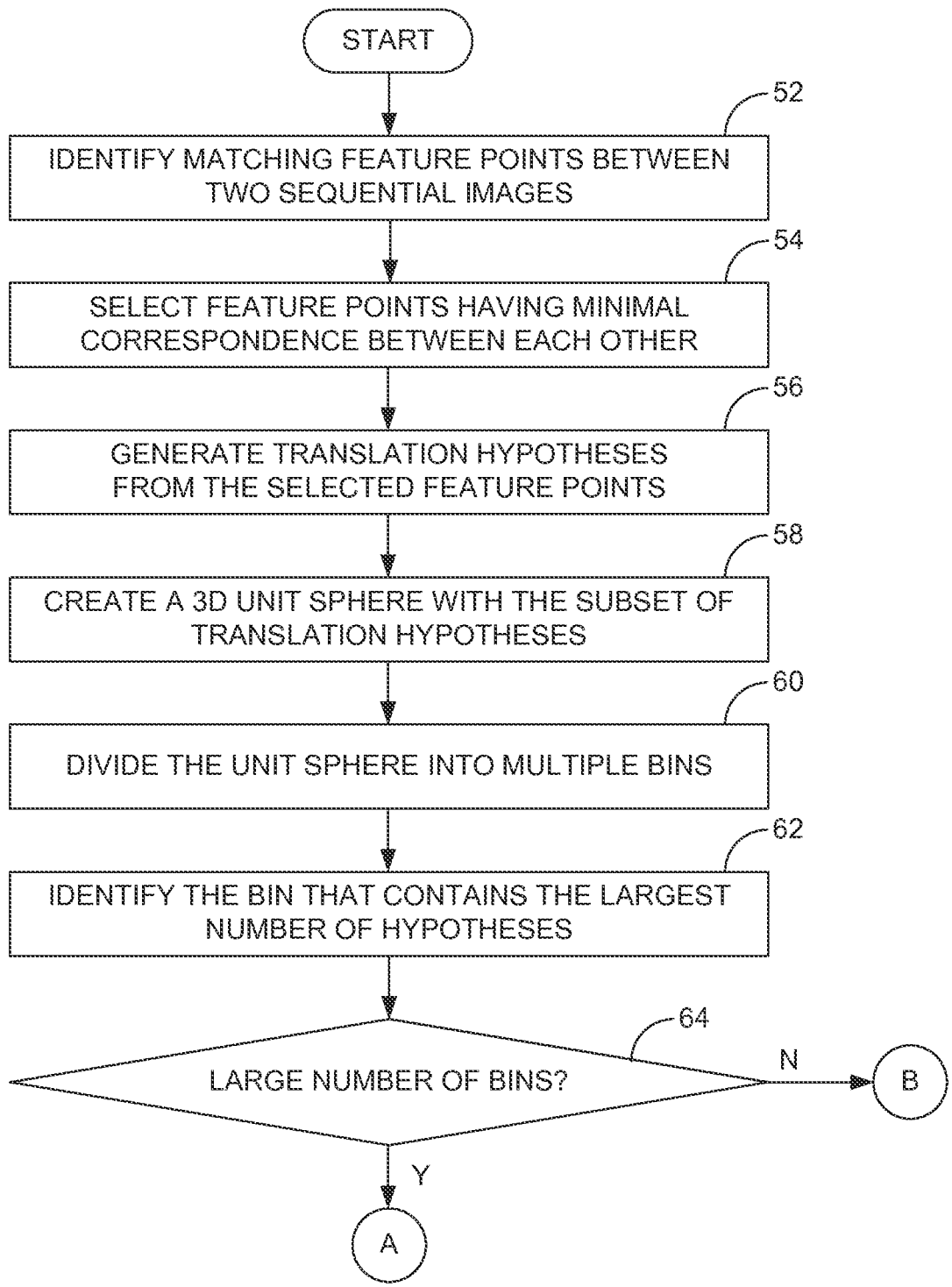
FIGS. 10A and 10B provide a flow diagram of an embodiment of a method for estimating a translation component of pose.
Figure 10B:
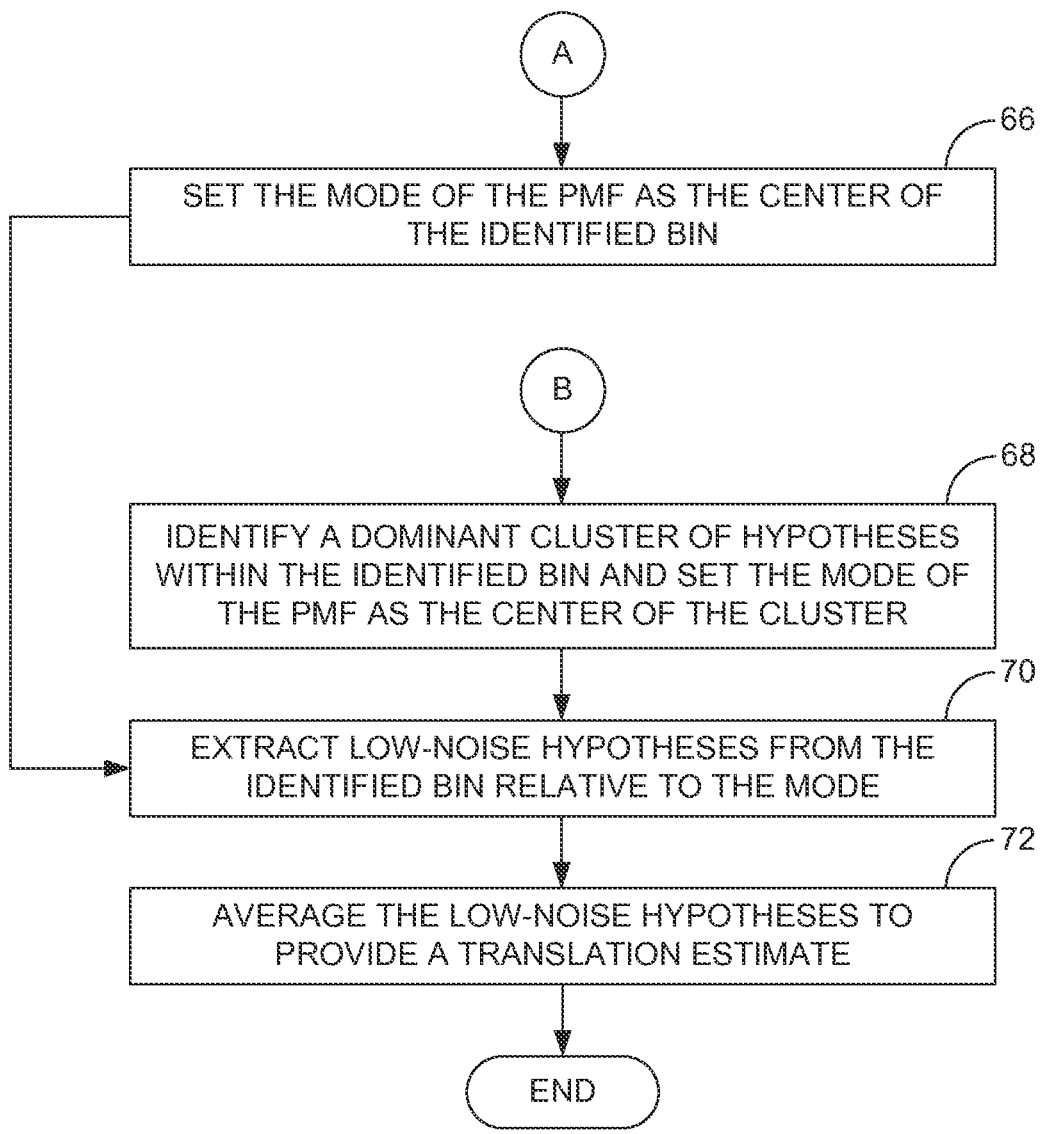

FIGS. 10A and 10B illustrate an example method for estimating the translation component of pose. The method for estimating the translation component is similar to the method described in relation to FIGS. 9A and 9B for estimating the rotation component. Therefore, multiple matching feature points are identified between two sequential images, as indicated in block 52, and the feature points that have minimal correlation between each other are selected, as indicated in block 54.

Referring next to block 56, translation hypotheses are generated from the selected feature points. In some embodiments, the hypotheses are generated using a normalized 8-point algorithm, which outputs unit translation vectors that characterize the translation between the two images. The unit translation vectors each have a magnitude of one and therefore map onto a three-dimensional unit sphere, as indicated in block 58.

At this point, the mode of the PDF of the hypotheses can be identified. In this embodiment, the mode is identified by first dividing the three-dimensional unit sphere into multiple regions or bins, as indicated in block 60, and identifying the bin that contains the largest number of hypotheses (i.e., the bin to which the largest number of vectors extend), as indicated in block 62.

Once the bin that contains the largest number of hypotheses has been identified, flow from this point can depend upon the number of bins that were created. With reference to decision block 64, if a large number of bins was created, flow continues to block 66 of FIG. 10B and the mode can be set as the center of the identified bin. If, on the other hand, a relatively small number of bins was created, flow continues to block 68 of FIG. 10B and the mode is set as the center of the dominant cluster of hypotheses within the identified bin.

Low-noise hypotheses are next extracted from the identified bin relative to the location of the mode, as indicated in block 70. In some embodiments, the low-noise hypotheses are extracted by determining the geodesic distance of each hypothesis (vector) within the identified bin from the mode and selecting the hypotheses that are within a predetermined distance of the mode.

Once the low-noise hypotheses have been extracted, they are averaged to produce an estimate of translation, as indicated in block 72.

It is noted that, if multiple cameras are or a stereo camera is used, the actual translation (as opposed to the unit translation) can be determined. In such a case, the various hypotheses will not lie on the surface of a unit sphere. Instead, the hypotheses will be distributed within three-dimensional space that can be thought of as being contained within a three-dimensional cube. The cube can be divided into a plurality of bins (sub-cubes) and the mode can be determined by identifying the bin that contains the largest number of hypotheses in similar manner to that described above in relation to FIGS. 10A and 10B.

Figure 11:
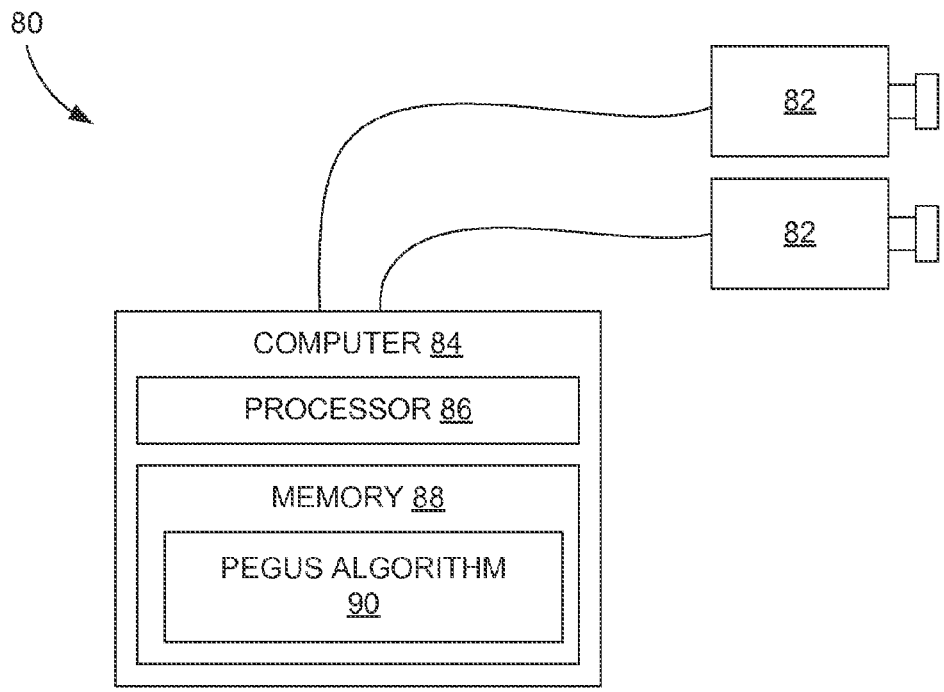
FIG. 11 is a block diagram of an embodiment of a system for estimating the pose of an object.

FIG. 11 illustrates an example system 80 for estimating pose. As indicated in that figure, the system 80 comprises at least one camera 82 that is linked to a computer 64. In some embodiments, the camera(s) 82 can be fixedly mounted to an autonomous vehicle (not shown). The computer 84 can similarly be mounted to or contained within the vehicle, or can be remote from the vehicle. In operation, images that are sequentially captured by the camera(s) 82 are received by the computer 84 and processed in the manner described above using a PEGUS algorithm 90 stored in memory 88 of the computer and executed by a processor 86 of the computer.

A novel robust two-view relative pose estimation algorithm has been described in the present disclosure. As discussed above, hypothesize-and-test methods such as RANSAC ignore all but one of the good hypotheses, whereas the disclosed algorithm identifies a set of "low-noise" pose hypotheses among the large number of possible ones and then averages them appropriately to compute an estimate. Identification of the "low-noise" set of hypotheses is simplified by expressing rotations as unit quaternions that lie on the 3-sphere $\mathbb{S}^3$ and constructing a histogram by gridding $\mathbb{S}^3$. The same technique is used for unit translations, except that the hypotheses are points on the unit sphere in three dimensions. Experimental results have demonstrated improved performance relative to the RANSAC+least squares method and the nonlinear mean shift, both in terms of estimation accuracy and computation time. Since the disclosed method does not involve any iterative search, its computation time is more predictable than that of RANSAC and nonlinear mean shift.

The invention claimed is:

1. A method for guidance and navigation of an autonomous vehicle, the autonomous vehicle comprising at least one camera, the method comprising:
   processing a plurality of images of an environment of the autonomous vehicle captured using the at least one camera of the autonomous vehicle over a period of time to track one or more objects within the environment, wherein processing the plurality of images to track the one or more objects in the environment comprises processing at least two images of the plurality of images to estimate a pose of a first object in the environment, wherein processing the at least two images to estimate the pose of the first object comprises:
   generating hypotheses for a pose component of pose of the first object;
   identifying a mode of a probability mass function associated with the hypotheses;
   extracting low-noise hypotheses; and
   averaging the low-noise hypotheses to obtain an estimate for the pose component for the pose of the first object.

2. The method of claim 1, wherein generating hypotheses comprises generating rotation hypotheses for a rotation of the first object in the plurality of images.

3. The method of claim 2, further comprising converting the rotation hypotheses into unit quaternions in four-dimensional space to create a four-dimensional unit sphere.

4. The method of claim 3, further comprising dividing the four-dimensional unit sphere into multiple bins of equal size.

5. The method of claim 4, further comprising identifying the bin that contains the largest number of quaternions.

6. The method of claim 5, wherein identifying the mode comprises setting the mode as a center of the identified bin or a center of a dominant cluster of quaternions within the identified bin.

7. The method of claim 1, wherein generating hypotheses comprises generating unit translation hypotheses that create a three-dimensional unit sphere.

8. The method of claim 7, further comprising dividing the three-dimensional unit sphere into multiple bins of equal size.

9. The method of claim 8, further comprising identifying the bin that contains the largest number of hypotheses.

10. The method of claim 9, wherein identifying the mode comprises setting the mode as a center of the identified bin or a center of a dominant cluster of hypotheses within the identified bin.

11. The method of claim 1, wherein extracting low-noise hypotheses comprises identifying the hypotheses that are within a predetermined distance of the mode.

12. A system for estimating pose, the system comprising:
a camera configured to capture sequential images;
a computer comprising memory that stores pose estimation algorithm configured to estimate pose of an object from the sequential images by:
generating hypotheses for a pose component under consideration,
identifying a mode of a probability mass function associated with the hypotheses,
extracting low-noise hypotheses, and
averaging the low-noise hypotheses to obtain a pose component estimate.

13. The system of claim 12, wherein generating hypotheses comprises generating rotation or translation hypotheses.

14. The system of claim 12, wherein the algorithm is further configured to create a unit sphere, each hypothesis being located on a surface of the unit sphere.

15. The system of claim 14, wherein the algorithm is further configured to divide the unit sphere into multiple bins of equal size.

16. The system of claim 15, wherein the algorithm is further configured to identify the bin that contains the largest number of hypotheses.

17. The system of claim 16, wherein the algorithm is further configured to set the mode as the center of the identified bin or the center of a dominant cluster of hypotheses within the identified bin.

18. The system of claim 12, wherein extracting low-noise hypotheses comprises identifying the hypotheses that are within a predetermined distance of the mode.

19. A non-transitory computer-readable medium having encoded thereon executable instructions that, when executed by at least one processor, cause the at least one processor to carry out a method for guidance and navigation of an autonomous vehicle, the autonomous vehicle comprising at least one camera, the method comprising:
processing a plurality of images of an environment of the autonomous vehicle captured using the at least one camera of the autonomous vehicle over a period of time to track one or more objects within the environment, wherein processing the plurality of images to track the one or more objects in the environment comprises processing at least two images of the plurality of images to estimate a pose of a first object in the environment, wherein processing the at least two images to estimate the pose of the first object comprises:
identifying matching feature points between sequential images;
generating hypotheses for a pose component of the pose of the first object;
identifying a mode of a probability mass function associated with the hypotheses;
extracting low-noise hypotheses; and
averaging the low-noise hypotheses to obtain an estimate for the pose component of the pose of the first object.

20. The computer-readable medium of claim 19, wherein the method further comprises:
creating a unit sphere, each hypothesis being located on a surface of the sphere;
dividing the unit sphere into multiple bins of equal size;
identifying the bin that contains the largest number of hypotheses; and
setting the mode as the center of the identified bin or the center of a dominant cluster of hypotheses within the identified bin.

21. The computer-readable medium of claim 19, wherein extracting low-noise hypotheses comprises identifying the hypotheses that are within a predetermined distance of the mode.

22. The method of claim 1, wherein:
hypotheses are low-noise when within a threshold amount of the mode; and
extracting the low-noise hypotheses comprises identifying hypotheses that are within the threshold amount of the mode.

23. The method of claim 1, wherein generating hypotheses for a pose component of pose of the first object comprises:
identifying matching feature points of the plurality of images; and
processing the matching feature points to determine the hypotheses.

24. The method of claim 2, wherein generating hypotheses further comprises generating unit translation hypotheses that create a three-dimensional unit sphere.

25. The method of claim 1, wherein:
the pose comprises two pose components, a first pose component being rotation and a second pose component being translation;
the method further comprises separately estimating rotation and translation;
estimating rotation comprises performing the acts of generating hypotheses, identifying the mode, extracting low-noise hypotheses, and averaging the low-noise hypotheses; and
estimating translation comprises performing the acts of generating hypotheses, identifying the mode, extracting low-noise hypotheses, and averaging the low-noise hypotheses.

26. An autonomous vehicle comprising:
at least one camera;
at least one processor; and
at least one storage medium having encoded thereon executable instructions that, when executed by the at least one processor, cause the at least one processor to carry out a method for guidance and navigation of the autonomous vehicle, the method comprising:
processing a plurality of images captured by the at least one camera over a period of time to track a first object in an environment of the autonomous vehicle, wherein tracking the first object comprises estimating a relative pose of the first object between a first image and a second image of the plurality of images, wherein estimating the relative pose of the first object comprises:
estimating a translation of the first object between the first image and the second image based at least in part on the first image and the second image, and
separately from estimating the translation, estimating a rotation of the first object between the first image and the second image based at least in part on the first image and the second image.

27. The autonomous vehicle of claim 26, wherein estimating the rotation comprises:
generating hypotheses for the rotation, each of the hypotheses identifying an estimated rotation;

identifying, from the hypotheses, low-noise hypotheses at least in part by identifying a mode of the estimated rotations and a subset of the hypotheses within a threshold amount of the mode, the subset of the hypotheses being the low-noise hypotheses; and averaging estimated rotations of the low-noise hypotheses to obtain the rotation for the first object.

28. The autonomous vehicle of claim 26, wherein estimating the translation comprises:

generating hypotheses for the translation, each of the hypotheses identifying an estimated translation;

identifying, from the hypotheses, low-noise hypotheses at least in part by identifying a mode of the estimated translations and a subset of the hypotheses within a threshold amount of the mode, the subset of the hypotheses being the low-noise hypotheses; and averaging estimated translations of the low-noise hypotheses to obtain the translation for the first object.

* * * * *